May 26, 1970     W. H. JENKINS     3,514,175

STRUCTURAL CLOSURE MEMBERS WITH ABSORPTION AND REFLECTION FILMS

Filed June 24, 1966     2 Sheets-Sheet 1

INVENTOR
WESTON H. JENKINS

BY Clarence R. Patty Jr.
ATTORNEY

INVENTOR
WESTON H. JENKINS

United States Patent Office 3,514,175
Patented May 26, 1970

3,514,175
STRUCTURAL CLOSURE MEMBERS WITH ABSORPTION AND REFLECTION FILMS
Weston H. Jenkins, Corning, N.Y., assignor to Corning Glass Works, Corning, N.Y., a corporation of New York
Continuation-in-part of application Ser. No. 432,938, Apr. 28, 1966. This application June 24, 1966, Ser. No. 565,032
Int. Cl. G02b 5/20
U.S. Cl. 350—1                                10 Claims

ABSTRACT OF THE DISCLOSURE

A structural closure member for absorbing a substantial amount of solar radiation, particularly in the near infra-red portion of the solar spectrum, which comprises a first body, which is a substantially transparent sheet of heat-absorbing glass or a glass bearing a heat absorbing material on the outer surface exposed to solar radiation, the first body absorbing solar radiation at one wave length and emitting secondary radiation of a longer wave length, and a substantially transparent second body on the side of the first glass sheet body which faces in towards the enclosure, the second body being preferably a film of a metal oxide having a lower emissivity for secondary radiation than the surface of the first glass sheet body which is directly exposed to solar radiation.

---

Figure 1:
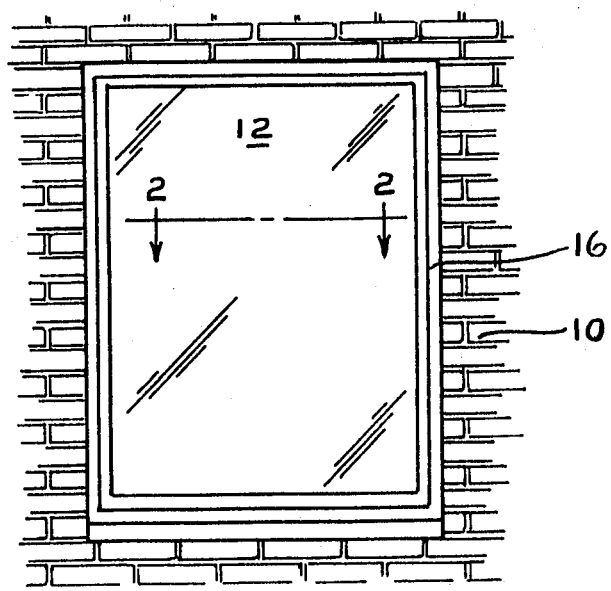

This invention relates to structural closure members that are adapted to absorb a substantial amount of solar radiation, particularly in the near infrared portion of the solar spectrum. It is especially concerned with an improvement in such closure members whereby secondary radiant energy resulting from such absorption is selectively emitted and transfer of solar thermal energy into the structure is thus further reduced. This application is a continuation-in-part of application Ser. No. 432,938, filed Apr. 28, 1966 for Structural Closure Members, in the name of Weston H. Jenkins, now abandoned application Ser. No. 432,938, in turn, is a continuation of application Ser. No. 100,985, filed Apr. 5, 1961, now abandoned, for Structural Closure Members, in the names of Weston H. Jenkins and John M. Mochel.

A basic function of any closure member is to permit transmission of visible radiations, thereby providing both visibility and illumination. It is common experience, however, that conventional glass closures may be a source of considerable physical discomfort on a sunny day. Thus, a sharp rise in ambient temperature may occur in a room or vehicle interior. Also, glare or brightness may occasion visual discomfort.

There is then a well recognized problem of effectively and economically minimizing the undesirable effects of solar radiation while still utilizing it as a means of providing adequate visibility and illumination. The present invention is directly concerned with all aspects of this problem, but especially the thermal aspect which becomes of major significance in the building and vehicle fields. Recent design trends in both of these fields have been in the direction of larger glass closures. This, of course, accentuates the solar control problem and has intensified the search for a satisfactory means of coping with it.

The energy from solar radiation is approximately evenly divided between visible and infrared radiation. The former is radiation within the spectral limits of about 0.4–0.7 micron. The latter is radiation of wave lengths beyond 0.7 micron, and is largely within the near infrared portion of the spectrum, that is 0.7–2.0 microns.

Customarily, thermal energy is thought of in terms of infrared radiation. However, in the present instance, it should be appreciated that both the visible and infrared portions of solar radiation will effectively contribute thermal energy within an enclosed structure. Strictly from the standpoint of thermal energy control then, reduction in effective transfer of either visible or near infrared radiation, or both, is advantageous. However, reduction or elimination of the former may unduly sacrifice visibility and illumination, whereas the latter can be completely eliminated with only loss of thermal energy.

In combating the solar thermal energy problem, it is current practice to provide an air cooling and conditioning system, install auxiliary solar shielding devices such as drapes, louvered blinds, overhangs, and the like, or employ both expedients. The former, while generally effective, tends to be both costly and space consuming. The latter usually tend to reduce visibility and illumination much more effectively than they reduce solar heat transfer. In the extreme situation, visible radiation is essentially completely blocked out while heat transfer is only partially controlled. This, of course, largely defeats the basic purpose of a transparent closure.

Sheets and/or films of various metals and metal sulfides are known to be efficient reflectors of infrared radiations. Films of such materials are applied by thermal evaporation and condensation on the desired substrate in a high vacuum. Such evaporated films have been successfully employed on lenses and similar optical components. However, it has not proven feasible to apply such films over large glass surfaces, such as continuous sheet glass conventionally produced for fabrication of structural closure members. Accordingly, these materials have created little or no interest in the structural closure field.

U.S. Pat. No. 2,564,708 teaches that certain iridized metal oxide films, that is films deposited by an iridizing process, tend to reflect infrared radiation longer than about 2 microns. It further discloses, however, that such reflectance does not occur to any appreciable extent in the near infrared portion of the spectrum, that is at wave lengths of 0.7–2.0 microns. Consequently, the utility of such films as direct reflectors of solar radiation is of minor interest since the amount of solar radiation beyond 2 microns constitutes less than 5% of the total energy from solar radiation.

As a result, these iridized films have found considerable commercial application in heat reflecting shields designed to minimize long wave length radiation transfer, e.g. from a furnace to an enclosed area in which the furnace operator is stationed. However, they have been logically disregarded by the structural closure art where primary interest has been in near infrared and visible radiation. Meanwhile strenuous efforts have been directed at other approaches to the problem such as more efficient cooling systems, metal type reflectors, and absorbing media.

It has been well recognized for several decades that certain constituents, particularly ferrous oxide, in a glass composition are very effective in absorbing near infrared solar radiation as well as some visible radiation. Such glasses are commonly referred to in the glass art as heat absorbing glasses. Numerous patents describe both silicate and phosphate compositions that are particularly suited to that purpose. Among these are U.S. Pats. Nos. 1,737,685 and 1,737,686, issued to W. H. Rising, and No. 2,194,784 issued to E. Berger.

Structural closure members produced from such glasses may quite effectively absorb solar radiation and thereby reduce direct transfer of solar thermal energy. However, such absorption quickly results in a marked increase in glass temperature. As a result, convection currents tend to develop across the glass surface, thus conveying heat into the room or other enclosure. This effect has been well recognized.

The hot glass also becomes a secondary heat radiator, that is a source of radiant energy itself. This secondary radiation, together with the convection currents which develop across the hot glass surface, greatly diminish the apparent effectiveness of heat-absorbing glasses in controlling heat transfer through closure members. As a result, heat absorbing glasses have found only a rather limited application in the structural closure member field.

Major emphasis heretofore has been on the convection factor. However, it can be shown that the heat contribution due to secondary radiation may be nearly double that resulting from normal convection currents. It becomes apparent that control of this secondary radiation is the major problem in the improvement of solar radiation absorbing media. Accordingly, a primary purpose of the present invention is to provide a means for controlling such secondary radiation, thereby indirectly reducing solar thermal energy transfer.

It has now been discovered that certain glass, and similar vitreous, surfaces coated with a thin film of metal oxide may have a surprisingly low relative emissivity for the secondary radiant energy emitted by heat absorbing glasses and similar solar radiation absorbing media. On the basis of this discovery, it has been found that the effectiveness of so-called heat absorbing closure members in reducing solar energy transfer can be markedly improved by interposing such a low emissivity film on the inner surface of the closure member. A further significant factor is that absorption of visible radiation can be controlled by selection of the low emissivity films. Also the favorably low emissivity applies regardless of the nature of the absorbed solar radiation, thereby permitting a favorably high ratio of luminous transmittance to total energy transmittance. It is also important that the metal oxide films are adapted to application over large glass surfaces by methods that be readily coordinated with rolling, drawing, and other large volume glass forming methods.

In accordance with the invention, a structural closure member comprises means for absorbing solar radiation of given wave lengths and emitting secondary radiation of longer wave lengths, a front surface adapted to be exposed to solar radiation, a second interior surface adapted to face the enclosed area, and a metal oxide film applied over the second surface that has a lower emissivity for said secondary radiation than the front surface. The invention further resides in a method of reducing solar energy transfer through a structural member which comprises incorporating in such member a solar radiation absorbing medium which radiates the absorbed energy at a longer wave length and providing a low emissivity metal oxide film on the interior surface of the closure member.

The metal oxide film facing the enclosed space may be applied to the absorbing member by any suitable technique. In the preferred practice of the invention, metal oxide films deposited by iridizing are employed.

Figure 2:
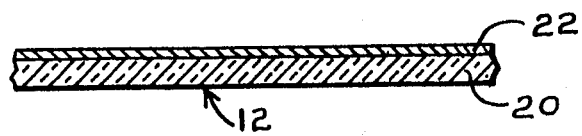
Figure 3:
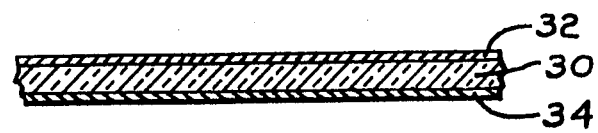
Figure 4:
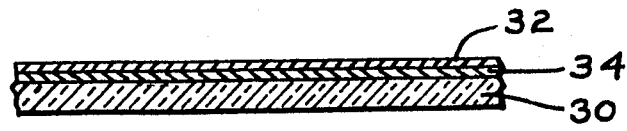
Figure 6:
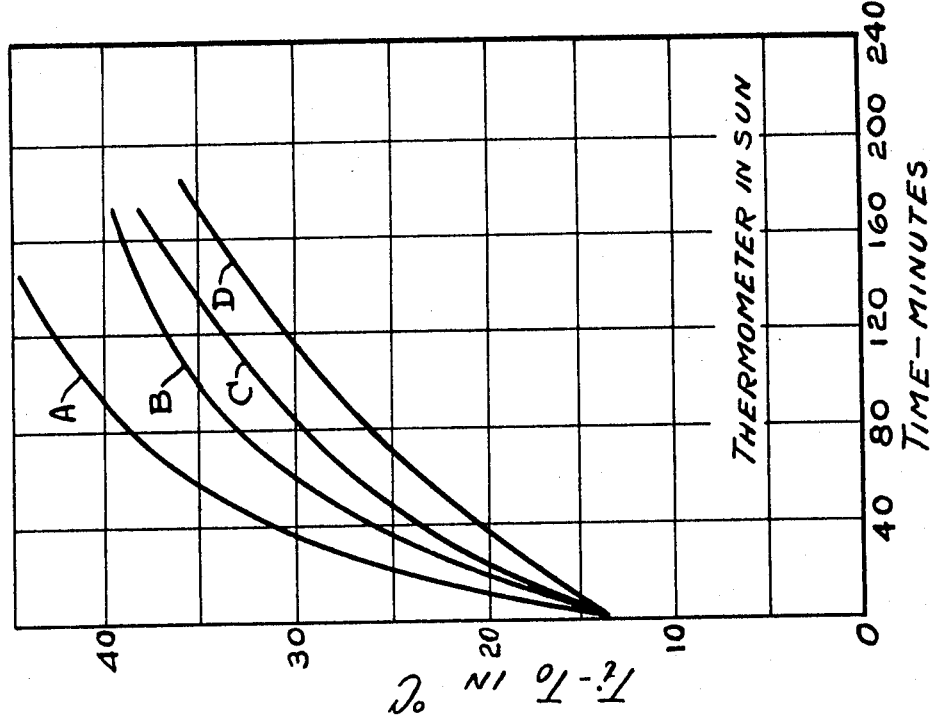
Figure 5:
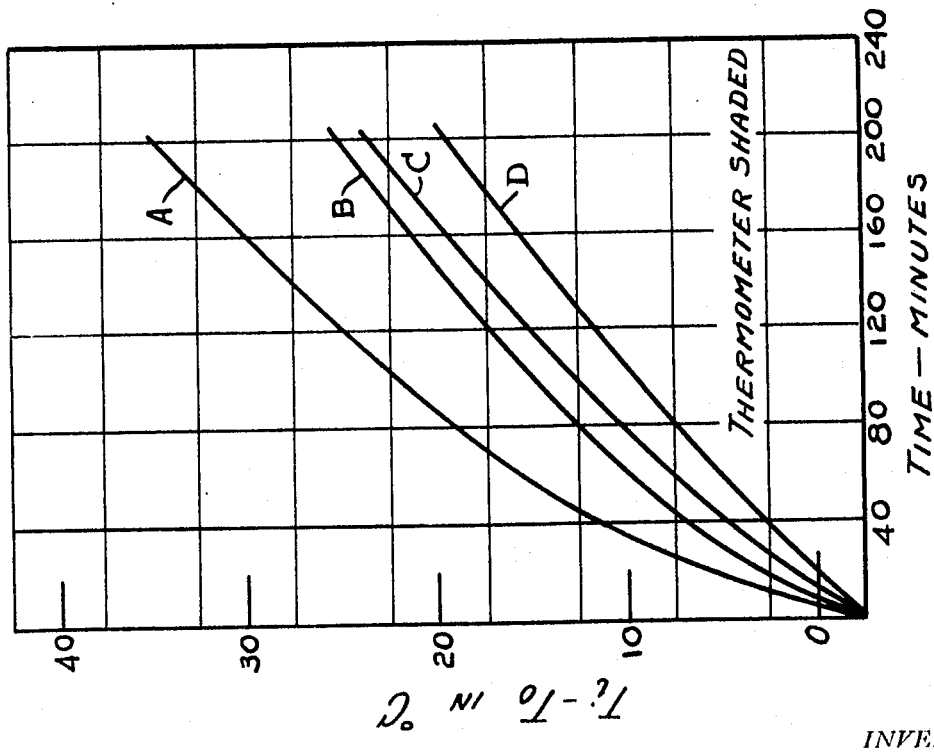

The invention is further described with reference to the accompanying drawings wherein:

FIG. 1 is a front elevation of a glazing unit illustrating a typical embodiment of the invention, FIG. 2 is a sectional view along line 2—2 of FIG. 1, FIGS. 3 and 4 are sectional views illustrating a modified form of the invention, and FIGS. 5 and 6 are graphical illustrations of the thermal advantage provided by the invention.

In FIG. 1, an opening in exterior building wall 10 is closed by a window, generally designated 12. The latter is a single sheet of iridized glass mounted in a frame 16 and affixed in wall 10 in any conventional manner. As shown in FIG. 2, iridized window 12 is composed of a sheet of heat absorbing glass 20 and a thin, adherent, metal oxide film 22 formed on the inner or interior surface of the sheet as installed in wall 10.

FIG. 3 illustrates a modified type of window which may, for example, include a sheet of glass 30 corresponding identically with glass sheet 20 of FIG. 2, except that it is fabricated from conventional closure glass. Glass sheet 30 is provided with an iridized, low emissivity film 32 on its inner surface and a solar radiation absorbing film 34 of higher emissivity on the exterior surface. Alternatively, as shown in FIG. 4, films 34 and 32 may both be applied on the inside of glass sheet 30, providing absorbing film 34 is sandwiched intermediate glass 30 and the low emissivity film 32.

The structural closure member is not restricted in physical form. The designation refers generically to any conventional flat or curved glass shape used as a window, door, dome, panel, skylight, canopy, or the like, in buildings, vehicles, aircraft, and similar structures, to permit both visibility to the exterior and interior illumination. It may be mounted in any conventional manner. As will be illustratively demonstrated subsequently, it is a critical feature that the closure be mounted with the low emissivity coated surface facing the interior, that is opposite the surface exposed to solar radiation.

The heat absorbing medium is preferably provided by fabricating the structural member from a heat absorbing glass. Any of the silicate or phosphate heat absorbing glasses currently available or known in the art might be employed. In the case of a partially shaded building, only a portion of a heat absorbing glass closure member may be exposed to solar radiation. The temperature gradient that results can be of sufficient magnitude to cause fracture in a high expansion glass. Accordingly, a heat absorbing glass having a thermal coefficient of expansion below about $70 \times 10^{-7}/°$ C. is preferred. Phosphate glasses have been generally recognized as more efficient absorbing media, but are also more expensive to produce and fabricate. Accordingly, the choice of glass absorbing medium will depend on the particular application.

It will be understood that the term "heat absorbing glass" is used here in the conventional sense to mean a glass containing an additive which renders it effective to absorb a substantially greater amount of infrared or heat radiation per unit thickness, particularly in the near infrared region, than a corresponding glass not having such additive, as for instance, conventional lime or borosilicate plate or sheet glass. The art has not prescribed a sharp line of demarcation between "heat absorbing" glasses and "ordinary" or "conventional" glasses. However, commercial heat absorbing glasses in $\frac{1}{8}''$ thickness generally contain sufficient additives to enable such glasses, as compared to glasses of substantially the same composition and thickness but not containing such additives, to absorb an additional 20% or more of the near infrared portion of solar radiation. Customarily such glasses are characterized by the presence of a few tenths of a percent to a few percent of ferrous oxide in a silicate or phosphate glass, this oxide tending to increase in absorption in the red portion of the spectrum and to have an absorption peak at about 1 micron in the near infrared.

Other available types or forms of heat absorbing media, that is solar radiation absorbing media, may also be employed. Thus, a heat absorbing enamel might be applied over a conventional clear glass. An absorbing medium may also be introduced in or on the closure surface. As illustratively shown in FIG. 3, an absorbing oxide film may be applied to the front surface of a closure member, that is the surface opposite that on which the low emissivity film is deposited, by iridizing with a suitable compound. The absorbing film might also be applied on the same side as the low emissivity film, as in FIG. 4, but necessarily intermediate the glass and such low emissivity film.

The use of such other type of heat absorbing media is of particular interest in that it permits using a conventional closure glass rather than a specially melted heat absorbing glass. Concentration of the absorbent on or in the exterior surface layer is also of interest where, as in a vehicle, the surface may be exposed to strong air currents while in motion. The surface is thus effectively cooled by air flow and it may be desirable to concentrate the heat absorption adjacent to this cooling influence.

Iridized oxide films of metals having an atomic number from 22-29 are also of particular interest because of their additional potential for reflecting near infrared solar radiation. The effectiveness of these oxide films in this respect may be reinforced by controlling their thickness. It is desirable that they be quarter wave length films, that is having an optical thickness of an odd number of quarters (1, 3, 5, etc.) of the wave length of radiation to be reflected. This provides maximum effectiveness at such wave length, and films of 0.16-0.25 microns optical thickness are preferably employed. In accordance with this embodiment, a substantial amount of undesired infrared radiation may be reflected by the film with a further portion being absorbed and substantially rejected in accordance with the method of the present invention. Also, there is a minimum loss of visible transmission.

It is thus possible to combine an iridized film, such as an iron oxide film that reflects and absorbs appreciable amounts of radiant energy, with a heat absorbing glass and an interior surface film of lower emissivity. This combination provides maximum effectiveness in reduction of infrared or heat transfer, and a degree of visible absorption in each of the three elements thereby diminishing glare or brightness. Inasmuch as visible radiation also contributes thermal energy, such visible absorption will be highly desirable unless the concomitant reduction in visibility and illumination is too great. Consequently, the areas in which this combination may be employed will be determined by the extent to which loss of visible transmission is required or can be tolerated. In the interest of greater visible transmission, iridized titania films are of considerable interest since they are essentially colorless, unless reduced, but may reflect as much as 20% in the near infrared.

It will be appreciated that the closure member of this invention may be utilized as a component member of either a double glazed or laminated closure assembly. When used as an outer sheet in the former type of assembly, tendencies for interior convection currents to act as a means of energy transfer are minimized. Safety factors require the use of laminated assemblies in certain vehicle and other types of closures.

The low emissivity coating may be applied by any desired technique. It is conveniently applied by conventional iridizing techniques. In general, these involve contacting a heated glass surface with vapors, or an atomized solution, of a thermally decomposable metal salt, or metallo-organic compound, that decomposes to produce a corresponding metal oxide film on the heated surface. Numerous suitable iridizing materials and their method of application are known in the coating art, e.g., stannic chloride with a minor addition of antimony chloride or fluoride ion.

Although preferable it is not necessary that the low emissivity coating be a metal oxide coating. Other coatings, such as those formed of metallic gold, chromium, aluminum or tantalum, may be utilized as low emissivity coatings. Such coatings are preferably less than 1000 A. in thickness and may be applied by conventional vacuum evaporation or vacuum sputtering techniques.

EXAMPLE 1

The following example is set forth to illustrate a number of suitable iridizing materials as well as a convenient means of determining relative emissivity and thereby suitability of a film.

Flat plates of one-eighth inch thick, clear, uncolored borosilicate glass (approximately 80% $SiO_2$, 14% $B_2O_3$, 4% $Na_2O$, and 2% $Al_2O_3$ by weight) were provided with iridized, electrically conducting, metal oxide coatings on one surface. The coatings were applied to heating each glass plate to about 625° C. While maintained at about that temperature, the plates were exposed to an atomized mist of a metal chloride iridizing solution that thermally decomposed and deposited an oxide film under the conditions of application. The iridizing solution was applied for a sufficient time to provide an oxide film of predetermined thickness. The solutions employed were as follows:

(1) 100 grams $SnCl_4 \cdot 5H_2O$, 10 ml. concentrated aqueous hydrochloric acid, sufficient $H_2O$ to provide 100 ml. solution, and 1 ml. 60% hydrofluoric acid.

(2) 99 grams $SnCl_4 \cdot 5H_2O$, 1 gram $SbCl_3$, 10 ml. HCl, and $H_2O$ to provide 100 ml. solution; equivalent to a calculated film composition of about 98.5% $SnO_2$ and 1.5% $Sb_2O_3$.

(3) 97 grams $SnCl_4 \cdot 5H_2O$, 3 grams $SbCl_3$, 10 ml. HCl and $H_2O$ to provide 100 ml. solution; equivalent to about 95.8% $SnO_2$ and 4.2% $Sb_2O_3$.

(4) 95 grams $SnCl_4 \cdot 5H_2O$, 5 grams $SbCl_3$, 10 ml. HCl and $H_2O$ to provide 100 ml. solution; equivalent to about 93.2% $SnO_2$ and 6.8% $Sb_2O_3$.

Each solution was applied for a sufficient time to provide a corresponding metal oxide film in the following three thicknesses, having reference respectively to interference colors and optical thickness estimated from such colors: First order red, third order red and fifth order red; equivalent to about 0.16, 0.80, and 1.44 microns, respectively.

Each of the twelve glass plate samples thus produced was mounted individually and successively in a rectangular opening in the sidewall of a rectangular, metal, water tank. In the opposite side wall of the tank, an unfilmed, but otherwise corresponding, sample of the same glass was mounted in a similar opening as a reference standard.

The tank was mounted on a turntable to permit rotation through a 180° angle, thus permitting rapid reversal of the positions of the mounted glass plates. The tank was filled with distilled water, provided with electric heating means and a stirring device, and the water brought to a uniform temperature of 100° C. by heating to the point of vigorous boiling.

Outside the tank and facing the mounted window in the tank wall, a conventional thermopile and associated measuring equipment were arranged to face the window and receive all wave lengths of energy radiated from such window. The absolute emissivity of the reference glass plate was determined to be about 0.95. However for present purposes, relative emissivities were determined for the various coated glass samples, and reported in the subsequent table under the heading E. These are relative values with respect to the clear glass reference plate which was arbitrarily assigned a value of 1.0. In the table, the coated samples are identified by the numerals associated with the coating solutions above, and by letters indicating film thickness. The thinnest film in a series is identified by $a$ and the thickest by $c$.

TABLE I

Relative emissivity 100° C.

| Sample thickness: | E |
|---|---|
| Clear glass | 1.00 |
| 1a | .76 |
| 1b | .40 |
| 1c | .40 |
| 2a | .75 |
| 2b | .47 |
| 2c | .41 |
| 3a | .76 |
| 3b | .56 |
| 3c | .53 |
| 4a | .88 |
| 4b | — |
| 4c | .69 |

The 100° C. temperature was selected as a matter of convenience. However, the glass closure temperatures encountered in actual practice will usually not exceed 65°

C. Further experiments have indicated that, at such lower temperature, no significant change will occur in the relative emissivity data presented in the table and essentially uncoated glass was also mounted in the calorimeter. The data obtained from these tests is set forth in the following table:

TABLE II

| Glass | Thickness (mm.) | Coating | TE | LT | Ratio LT/TE |
|---|---|---|---|---|---|
| 1...... Phosphate............ | 8.40 | ............ | 53 | 72 | 1.36 |
| .....do................. | 2.44 | Inside...... | 50 | 70 | 1.40 |
| .....do................. | 2.44 | Outside..... | 60 | 70 | 1.17 |
| 2...... Silicate (1% FeO)...... | 2.45 | ............ | 51.5 | 49 | 0.95 |
| .....do................. | 2.15 | Inside...... | 51 | 49 | 1.20 |
| .....do................. | 2.15 | Outside..... | 50 | 49 | 0.98 |
| 3...... Silicate (2% FeO)...... | 3.33 | ............ | 46.5 | 49 | 1.06 |
| .....do................. | 2.33 | Inside...... | 44 | 51 | 1.16 |
| .....do................. | 2.33 | Outside..... | 49 | 51 | 1.04 |
| 4...... Silicate (4% FeO)...... | 3.23 | ............ | 39.5 | 22 | 0.56 |
| .....do................. | 2.67 | Inside...... | 30.5 | 22 | 0.72 |
| .....do................. | 2.67 | Outside..... | 44.5 | 22 | 0.5 | the same relationship will exist. Likewise, further tests have indicated that no significant difference exists between the relative emissivities of the borosilicate glass surface employed as a reference in the test above and similar, untreated heat absorbing silicate and phosphate glass surfaces.

Other factors being equal, it is desirable to select a film having the lowest posible relative emissivity. However, it will frequently be necessary to compromise in order to obtain more favorable properties in other respects such as visible transmission, esthetic effects and appearance. It is apparent that any relative emissivity less than 1.0 provides at least some benefit. As a practical matter, however, the relative emissivity of a film should not exceed about 0.7.

It will be appreciated that haze or light scattering in iridized films on borosilicate glasses is ordinarily of minor significance. However, to the extent that this becomes an appreciable factor on any glass, an alcohol solvent might be substituted in the above solutions or other known corrective measures taken to minimize haze in an iridized film.

It is apparent that it is generally preferable to employ a thicker film to decrease emissivity. However, this may increase color in the film and consequent loss in luminous transmittance. Thus film thickness in any given application represets a compromise to provide any optimum combination of characteristics or properties.

EXAMPLE 2

In order to illustrate the practical significance of a low emissivity film on a heat absorbing glass, a number of different glass plates were provided with a single surface iridized film produced from solution 1 of Example 1 above. Each of the samples was mounted in the opening of a calorimeter apparatus adapted to measure, by means of temperature rise within the device, the total energy (TE) transferred through the opening and hence through the glass sample mounted in such opening. This total energy measurement included heat energy obtained by direct transmission through the glass as well as reradiated energy arising from original absorption of solar radiation within the glass. The calorimeter device was suitably mounted on a roof top to permit direct exposure to solar radiation, normal to the surface of the glass test plate, over a period of time during which measurements were made. Luminous transmittance, (LT), that is total visible radiation corrected in known manner to take into account human eye sensitivity, was measured on a Weston light meter. The heat absorbing glasses selected as substrate materials for filming were a phosphate glass (approximately 56% $P_2O_5$, 20% $SiO_2$, 14% $Al_2O_3$, 6% flux materials, and 2% FeO by weight), and three similar silicate glasses (approximately 75% $SiO_2$, 9% $B_2O_3$, 1% $Al_2O_3$, 14% flux oxides, and 1-4% FeO by weight, the amount of the latter being increased to provide, respectively, light, medium and dark glasses). In conducting the test, each filmed glass sample was mounted first with the film facing the calorimeter interior and then with the film facing the sun, that is reversed. For comparison, a thicker sheet of The ratio $LT/TE$ is a figure of merit that indicates the degree to which total energy transfer (TE is minimized with respect to any desired degree of useful luminous transmittance. The ideal situation would be to eliminate the thermal effect of the solar radiation completely while retaining an optimum degree of visible radiation for a given application. This is, of course, unattainable. However, it is apparent from the above data that a substantial improvement results when a low emissivity film is applied on the inside surface in accordance with the present invention.

The reversed sample (film outside) indicates the relative effect of position on total energy transfer (TE) with no change in luminous transmittance (LT). The relatively thicker, unfilmed, heat absorbing glass samples were selected to provide an LT value approximating that of the thinner, filmed glass samples. The data indicate that a substantial advantage, in the figure of merit as well as in thickness, is achieved in the silicate glasses. While the figure of merit in the unfilmed phosphate glass approaches that of the inside filmed sample, it is apparent that the thickness is increased by a factor of about four in order to provide a comparable decrease in the TE value. In other words, a 1″ thick plate of plain glass would correspond to a ¼″ inside filmed sheet.

The following examples are provided as further specific illustrations of the invention.

EXAMPLE 3

A flat sheet of the borosilicate glass referred to above (Example 1) was provided on one surface with an iridized iron oxide film having an optical thickness of about 0.16 micron, that is a first order red film. A second sheet of the same glass was treated in the same manner, but provided on the opposite surface with a first order red film of tin-antimony composition identified as No. 2 in Example 1 above. A third sample was prepared corresponding to the above except that the solution 3 of Example 1 was used rather than solution 2. Both the total energy (TE) transferred and the luminous transmittance (LT) were measured on each of these samples with the following results:

| Sample | TE | LT |
|---|---|---|
| 1............................. | 58 | 49 |
| 2............................. | 51 | 40 |
| 3............................. | 30 | 23 |

EXAMPLE 4

A commercial silicate heat absorbing glass, sold under the trademark "Solex," was provided with an iridized film from solution 2 (Example 1) on one surface. When this test sample was measured in the calorimeter described above, and compared with an uncoated sheet of the same glass and same thickness, the results were:

| Sample | TE | LT | Ratio LT/TE |
|---|---|---|---|
| (1) Untreated glass............... | 57 | 79 | 1.38 |
| (2) Iridized glass................ | 40 | 62 | 1.55 |

EXAMPLE 5

A sample of the phosphate glass of Example 2 above was iridized with the second solution of Example 1, and was further provided with a 0.16 micron thick iron oxide iridized film on its opposite surface. When this sample was mounted in the calorimeter with the iron oxide coating facing the sun, the measured total energy transfer (TE) was 36% and the luminous transmittance (LT) was 55%, the ratio of the latter to the former being 1.53.

EXAMPLE 6

A further test was conducted to indicate more directly the benefits attainable by providing a low emissivity, iridized film on heat absorbing glass closures. Two identical plywood boxes were constructed to simulate, in miniature, an office or room having a large, single side opening adapted to be provided with a closure. Each box was provided with a ten inch by ten inch window opening and the remainder of the box surrounded with an external plywood casing spaced three inches from the box. This, in effect, provided a miniature room having plywood walls with a three inch spacing or separation which was filled with conventional glass fiber insulating material. The plywood walls were painted with an aluminum paint, except for the inside of the inner wall, which was painted with a neutral gray paint. The window opening in each box was finished in a manner to permit convenient insertion and removal of a flat sheet of glass designed to stimulate a closure member of window glass.

Black bulb mercury thermometers were mounted inside each box, one thermometer in each box being directly behind the window opening and a second in a shaded area. Samples for testing were prepared using rolled sheets of a commercial heat absorbing silicate glass similar in composition to the light shade glass of Example 2. For test purposes, a plate of this glass was coated on one side with a third order red, iridized film produced from the second solution shown in Example 2. A second plate was left uncoated for comparison. In carrying out the test, a test plate or closure was mounted in the opening of one box while the second box was fitted with a conventional, double strength lime glass window which was uncoated. The boxes were so positioned as to expose the face of the test plate directly to the sun's radiation, that is, normal to the radiation, and the boxes were reoriented at half hour intervals to compensate for movement of the sun. As a further compensation for any possible difference between the two boxes, two test runs were always made with a test sample, the windows being exchanged between the two boxes and the results averaged. The tests were initiated, in each instance, at 12:30 P.M. on sunny summer days and temperature readings on each of the thermometers mounted in each box were made at half hour intervals over periods of two to three hours. The data thus obtained forms the basis for the curves plotted in FIGS. 5 and 6, the former being based on shaded thermometer readings and the latter on unshaded thermometer readings. In these figures, time is plotted on the horizontal ordinate. The difference in temperature between the inside of the box and ambient or exterior air is plotted along the vertical ordinate as $T_1-T_0$. In each figure, curve A is based on data taken with an uncoated sheet of conventional lime or window glass; curve B is based on data from an uncoated sheet of the heat absorbing glass mounted in the box opening; curve C is based on data taken with the coated glass sample mounted in the box with the coating facing the sun; curve D is based on data taken with the coated plate facing the interior of the box.

It is recognized that secondary conditions in this exemplary test, e.g. convection currents, window to wall area ratio, etc., may vary to a considerable extent from those that would actually be encountered in a building or other occupied structure. However, these conditions are not of direct concern in the present instance and will vary widely in practice in any event. The described test does provide relative data with respect to a single primary factor in the influence of solar thermal energy on room temperature while minimizing the variable influence of secondary conditions, and does show the advantage of a combination of low emissivity films and heat absorbing glass in minimizing the temperature effect of solar thermal energy in a room or other enclosed area. Therefore, the test effectively indicates operativeness of the present invention to accomplish the basic purpose of improved thermal control.

What is claimed is:

1. A closure member for a structure comprising:
   a substantially transparent body of glass which normally transmits solar radiation to a space enclosed thereby when positioned as a closure in said structure, said glass member having a first surface which is exposed to solar radiation and a second surface which faces said space enclosed by said structure, and
   a pair of substantially transparent metal oxide films on at least one of said surfaces,
   one of said pair of substantially transparent metal oxide films being a material of a type which absorbs solar radiation of given wave length and emits secondary radiation of longer wave length, and
   the other of said pair of substantially transparent metal oxide films having a relatively low emissivity for said secondary radiation and being positioned inwardly toward said enclosed space with respect to said absorbing film.

2. A closure member in accordance with claim 1 wherein the glass has a coefficient of expansion not over $70 \times 10^{-7}$ ° C.

3. A closure member in accordance with claim 1 wherein said film having a relatively low emissivity is an iridized metal oxide film.

4. A closure member for a structure comprising:
   a glass member which normally transmits solar radiation to a space enclosed by said structure, said glass member having a first surface which is exposed to solar radiation and a second surface which faces said space,
   a film of a substantially transparent heat-absorbing terial on said second surface, said heat-absorbing material being of a type which absorbs solar radiation of a given wave length and emits secondary radiation of longer wave length, and
   a substantially transparent metal oxide film on substantially all of said second surface, said metal oxide film having a relatively low emissivity for said secondary radiation and constituting the innermost component of said closure member.

5. A closure member in accordance with claim 4 wherein said film of heat-absorbing material is a metal oxide film that selectively reflects near infrared radiation.

6. A closure member in accordance with claim 4 wherein said metal oxide film on said second surface is iridized.

7. A closure member for a structure comprising:
   a glass member which normally transmits solar radiation to a space enclosed by said structure, said glass member having a first surface which is exposed to solar radiation and a second surface which faces said space,
   a substantially transparent film of heat-absorbing material on said second surface, said heat-absorbing material being of a type which absorbs solar radiation of a given wave length and emits secondary radiation of longer wave length, and
   a substantially transparent second film applied on substantially all of said film of heat-absorbing material, said film having a relatively low emissivity for said secondary radiation and constituting the innermost component of said closure member.

8. A closure member in accordance with claim 7 wherein said second film comprises a metal oxide.

9. A closure member in accordance with claim 8 wherein said film of heat-absorbing material is a metal oxide film that selectively reflects near infrared radiation.

10. A closure member in accordance with claim 8 wherein said second film is an iridized film.

References Cited

UNITED STATES PATENTS

| | | |
|---|---|---|
| 1,434,268 | 10/1922 | Tillyer. |
| 2,564,677 | 8/1951 | Davis. |
| 3,051,596 | 8/1962 | Baltzer. |
| 3,069,301 | 12/1962 | Buckley et al. _____ 350—1 X |
| 3,078,693 | 2/1963 | Lytle. |
| 3,192,575 | 7/1965 | Rosenau et al. _____ 350—1 X |

FOREIGN PATENTS 559,218  7/1957  Belgium.

DAVID SCHONBERG, Primary Examiner

T. H. KUSMER, Assistant Examiner

U.S. Cl. X.R.

117—33.3; 350—166, 316

UNITED STATES PATENT OFFICE
CERTIFICATE OF CORRECTION

Patent No. 3,514,175　　　　　　　　　　Dated May 26, 1970

Inventor(s) Weston H. Jenkins

It is certified that error appears in the above-identified patent and that said Letters Patent are hereby corrected as shown below:

Column 7, line 43, "represets" should read --represents--.
Column 8, line 18, "(TE" should read --(TE)--.
Claim 4, column 10, line 42, "terial" should read --material--;
line 42, "second" should read --first--.

SIGNED AND
SEALED

SEP 29 1970

(SEAL)
Attest:

Edward M. Fletcher, Jr.
Attesting Officer

WILLIAM E. SCHUYLER, JR.
Commissioner of Patents